United States Patent
Kounavis

(10) Patent No.: US 10,262,397 B2
(45) Date of Patent: Apr. 16, 2019

(54) IMAGE DE-NOISING USING AN EQUALIZED GRADIENT SPACE

(71) Applicant: INTEL CORPORATION, Santa Clara, CA (US)

(72) Inventor: Michael E. Kounavis, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 1002 days.

(21) Appl. No.: 14/577,846

(22) Filed: Dec. 19, 2014

(65) Prior Publication Data
US 2016/0180504 A1 Jun. 23, 2016

(51) Int. Cl.
  *G06T 5/00* (2006.01)
  *G06T 5/20* (2006.01)
  *G06T 5/40* (2006.01)
  *G06T 7/13* (2017.01)

(52) U.S. Cl.
  CPC ............ *G06T 5/002* (2013.01); *G06T 5/20* (2013.01); *G06T 5/40* (2013.01); *G06T 7/13* (2017.01); *G06T 2207/20192* (2013.01)

(58) Field of Classification Search
  CPC .. G06T 5/002; G06T 5/20; G06T 5/40; G06T 7/13; G06T 2207/20192
  See application file for complete search history.

(56) References Cited

U.S. PATENT DOCUMENTS

| | | | | |
|---|---|---|---|---|
| 2004/0264751 A1* | 12/2004 | Avinash | ................ | G01R 33/56 382/128 |
| 2005/0249429 A1* | 11/2005 | Kitamura | ............... | G03B 17/00 382/255 |
| 2006/0050084 A1* | 3/2006 | Jeffrey | ................... | G06T 5/009 345/617 |
| 2010/0142778 A1* | 6/2010 | Zhuo | ......................... | G06T 5/50 382/128 |
| 2011/0292246 A1* | 12/2011 | Brunner | .................. | G06T 5/009 348/231.99 |
| 2013/0071028 A1* | 3/2013 | Schiller | ................... | G06T 5/003 382/180 |
| 2013/0230259 A1* | 9/2013 | Intwala | .................... | G06T 5/20 382/255 |
| 2014/0340416 A1* | 11/2014 | Teitlebaum | ............ | G06T 11/00 345/589 |
| 2015/0030248 A1* | 1/2015 | Humphrey | ................ | G06T 5/40 382/170 |
| 2016/0180504 A1* | 6/2016 | Kounavis | ................ | G06T 5/002 348/241 |

* cited by examiner

*Primary Examiner* — Edward Park
(74) *Attorney, Agent, or Firm* — Womble Bond Dickinson (US) LLP

(57) ABSTRACT

Image de-noising is described using an equalized gradient space. In one example, a method of de-noising an image includes determining an intensity gradient magnitude for an image, determining blurring radii for a plurality of pixels of the image using the intensity gradient, and blurring the image at each of the plurality of pixels using the blurring radii.

17 Claims, 5 Drawing Sheets

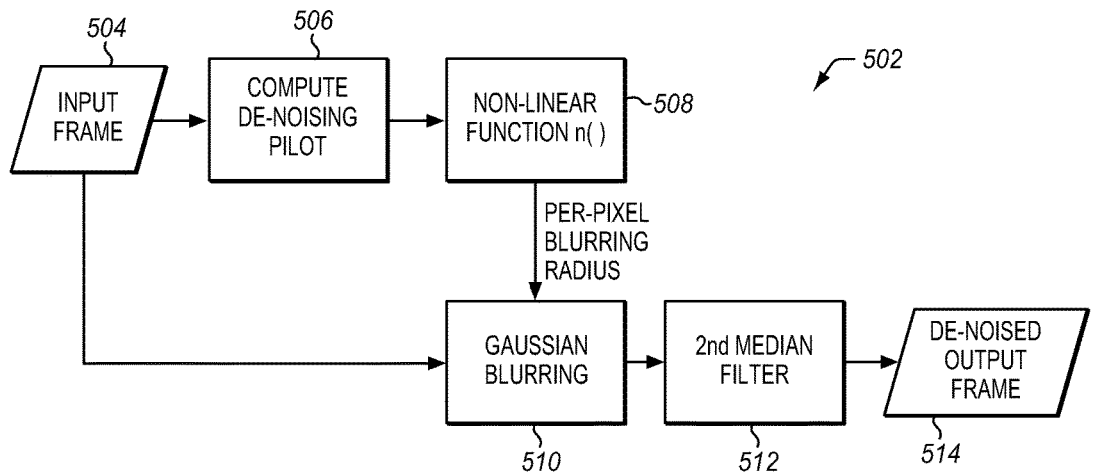
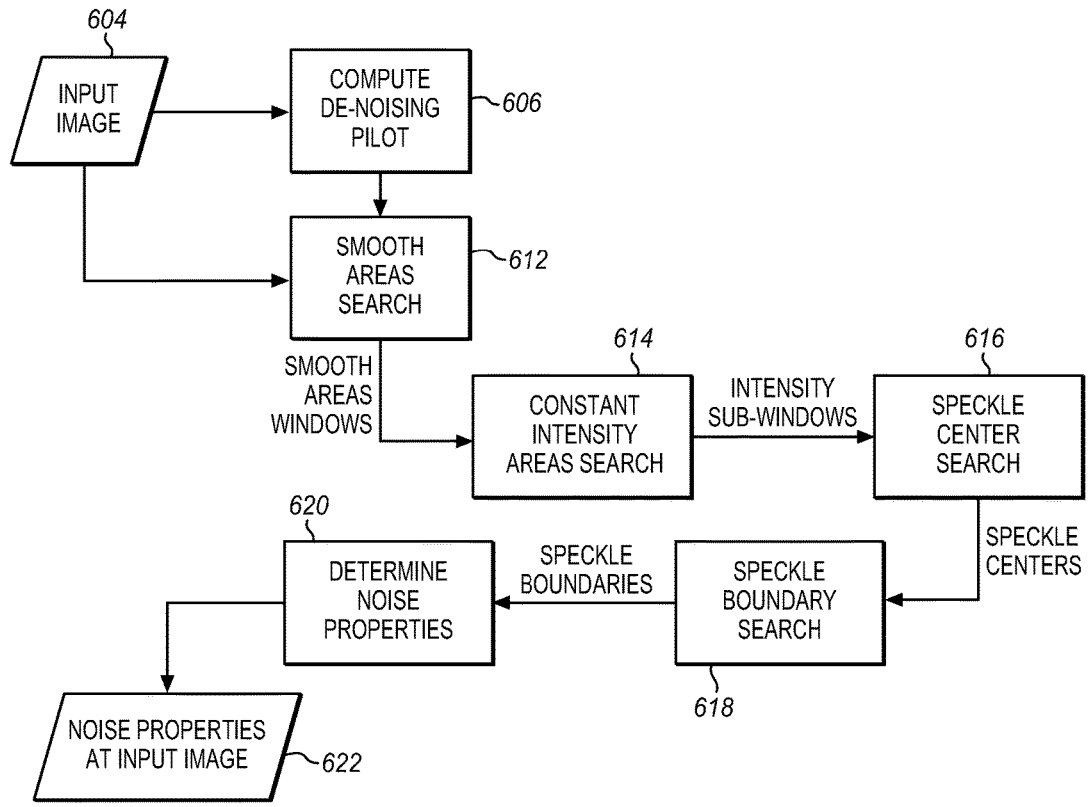

IMAGE DE-NOISING USING AN EQUALIZED GRADIENT SPACE

FIELD

The present description relates to digital image processing and in particular to processing operations related to noise determination and reduction in images.

BACKGROUND

Small digital cameras have become so inexpensive as to be offered on a wide range of portable and wearable devices from watches, to helmets, to computing tablets, to media players to cellular telephones of all kinds. Typical digital sensors have many limitations in the quality of the images that they can produce for still and video photography. Further limitations stem from the limits in digital camera cost and size. Image sensors suffer from noise in the captured images and the problem is greater with smaller image sensors. The noise is generated by the circuitry supporting each photodetector during image capture. The larger the signal from captured photons, the smaller the noise signal in comparison. The noise is relatively higher for smaller photodetectors that produce a smaller signal and for darker scenes that produce less light.

In many cases, it is possible to distinguish the noise from the image, but an accurate determination is slow and processor intensive. Many different de-noising techniques have been developed to remove noise from an image quickly before the image is stored or displayed. Some of these techniques are also suitable for a sequence of video frames and operate as the video is being recorded. One such fast technique is to blur the image. With video, images can be compared. If the noise is different for two sequential frames but the scene is not or if the scene is largely the same, then the noise can be identified and removed.

BRIEF DESCRIPTION OF THE DRAWINGS

Embodiments are illustrated by way of example, and not by way of limitation, in the figures of the accompanying drawings in which like reference numerals refer to similar elements.

FIG. 5 is a process flow diagram of de-noising an input image frame according to an embodiment.

FIG. 6 is a process flow diagram of determining noise properties of an input image frame according to an embodiment.

DETAILED DESCRIPTION

Figure 1:
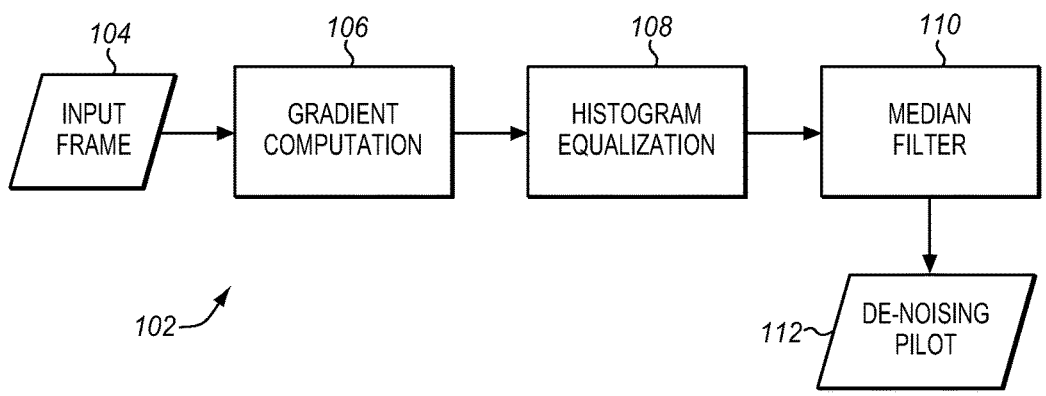
FIG. 1 is a process flow diagram of generating a de-noising pilot signal according to an embodiment.

Embodiments described herein include an intelligent blurring filter that performs de-noising using pixel information from a single frame only and does not require multiple frames. With the proliferation of low cost cameras, many devices may be augmented with imaging as well as with gesture-enabled commands. The commands may be used as switches for devices such as lights, TV sets, temperature control units, and user interfaces for computers, tablets, televisions, gaming consoles, etc. Gesture-based systems are only enjoyable when the system reliably and quickly is able to determine the gesture and then perform the indicated command. This may be difficult with a small wide angle camera and especially in the dark. The techniques described herein reduce speckles from images but retain image details. The reduced noise may be used to improve the performance of vision algorithms. The techniques may also be implemented with phone and tablet products to provide better image and video capture capabilities and HDR (High Dynamic Range) imaging.

The techniques described herein may be performed quickly with modest processing capabilities because of a balance between low cost localized operations per-pixel and the preservation of fine details of images such as wrinkles, hair, remote furniture lines, tree leaves etc.

An intelligent smoothing filter is described. The smoothing filter is more efficient than a standard Gaussian blurring filter. Instead of blurring an image uniformly across all pixels, the smoothing filter blurs each pixel separately using a different blurring radius each time. The blurring radius is determined differently for different circumstances. The more likely a pixel is an edge pixel, or the closer a pixel is to an important edge, the smaller the blurring radius is. Conversely, the less likely a pixel is an edge pixel or the farther a pixel is away from an important edge, the larger the blurring radius is. The blurring radius may be used for example to refer to the standard deviation parameter a of a Gaussian kernel used in local smoothing operations.

In some embodiments, the blurring radius for a pixel starts with a gradient magnitude associated with an input image. The gradient magnitude may be determined by convolving the input image with first order Gaussian derivatives associated with some standard deviation parameter $\sigma_I$. Standard deviation $\sigma_I$ may be determined so that it is in the same order as the average speckle of the noise that is to be removed. No additional information about the image capture noise is required.

This gradient magnitude signal is less useful for distinguishing between pixels which are closer to fine details and pixels which are further away or hit by noise. A typical image will have specific details, such as edges of real objects in the scene, that require a pixel to have a very different intensity value from the next pixel. However, noise in one pixel also causes a pixel to have a very different intensity value from the next pixel. As a result, it is difficult to define a set of absolute gradient values which directly correspond to meaningful blurring radii (i.e., it is difficult to successfully reduce noise while preserving image details).

As described herein, the gradient magnitude signal is passed through an equalization operation which includes a cumulative distribution function followed by a stretching operation to some range such as 0-255. The stretching operation extends or reduces all values obtained by applying the equalization function to fill a predefined range. 255 corresponds to 8 bits which is often the number of bits used for pixel values in an image. However, other ranges may be used instead. The resulting signal which is called an equalized gradient herein is then corrected by applying some median filter. The size of the median filter depends on the Gaussian derivative standard deviation parameter $\sigma_I$. The output of this median filter is called a 'de-noising pilot' herein and is used for completing the image de-noising process.

The equalization operation may be applied based on an assumption that the intensity increments and decrements in the image that are caused by meaningful image edges and details are typically larger than the intensity increments and decrements that are caused by noise. In addition, the pixels in the image that define edge details are typically much fewer than the remaining image pixels. These assumptions lead to visually satisfying results. On the other hand, the image gradient is not a reliable input for controlling the blurring radius in a de-noising operation. The equalized gradient, especially if corrected through some median filter, is a reliable input. Furthermore, the equalized gradient values associated with an input image may be used directly for specifying blurring radii that can potentially eliminate noise, while preserving many fine image details like hair, wrinkles etc.

The de-noising of the input image may be completed by passing the de-noising pilot through some non-linear function. The function may be related to the camera or image sensor characteristics and the overall level of illumination in the image. This function returns the blurring radius that was used for each pixel. In some embodiments functions are used that typically return some reasonably large constant blurring radius value for inputs smaller than a first threshold $T_1$. The function reduces the blurring radius rapidly, up to inputs equal to a second larger threshold $T_2$. The function keeps the outputs constant, such as a low or zero radius value for the input values greater than the second threshold.

The last operation before completing the de-noising process may be a second median filter which is applied on the output of the blurring stage. This second median filter is used for eliminating smaller speckles which may not have been filtered by the previous operations, due to the blurring operation being based on the equalized gradient magnitude signal (referred to as the gradient signal herein). The size of the second median filter may be determined based on the standard deviation parameter $\sigma_f$.

A simple approach to de-noise an image is to compute an average across multiple frames. This approach assumes that the background and foreground of a scene remain reasonably static for a number of frames. This approach also requires storing multiple frames in a buffer which can be a significant memory requirement. Embodiments described herein are able to perform de-noising based only on a single frame. This avoids storing multiple frames.

FIG. 1 is a diagram of an image processing pipeline 102. In the diagram, an input image frame 104 is first passed into an image gradient computation stage 106. The image gradient is then passed into a histogram equalization stage 108 producing an equalized gradient. Next, the equalized gradient is corrected using a median filter 110 producing an image de-noising pilot signal. The de-noising pilot signal is used for further de-noising the input frame as shown for example in FIG. 5.

Image de-noising may be realized in a variety of different ways. Referring to FIG. 5 the pilot signal is passed through a non-linear function n( ) 508 which returns per pixel radii values controlling the level of blurring which is to be performed on the input frame. Next, a Gaussian blurring stage 510 uses the determined radii values to blur the input frame 504 using a different blurring radius for each pixel. The blurring radii are returned by the function n( ), the same function used in the non-linear function block 508. The algorithm is designed so that the blurring is extensive for pixels which are in the interior of large smooth areas of the image but almost non-existent for pixels that define critical details. Finally, a second median filter 512 removes any noise speckles which may have been overlooked by the previous stages. These modules may be implemented in an image signal processor (ISP) of a camera or recorder. Alternatively, the may be implemented in specialized hardware, firmware, or software that is dedicated to performing these functions. The ISP may be incorporated into an image sensor or camera module or may be a separate component.

Referring again to FIG. 1, in image gradient computation 106, an entire input frame 104 is received for analysis. The gradient of the intensity of image pixel values of a two dimensional grayscale image I(x,y) is defined here as the vector $\nabla I(x,y) = (I_x(x,y), I_y(x,y))$ where $I_x(x,y)$ and $I_y(x,y)$ are the first order spatial derivatives of the intensity of the image in the dimensions of the x and y axes. The gradient vector denotes the direction where the biggest change in grayscale intensity is observed at each pixel. Moreover, the magnitude G(x, y) of the gradient vector reflects the amount of this grayscale intensity change. The image gradient may be expressed as a vector or as the magnitude of the vector. Generally, in the present description the magnitude will be used not the vector. Unless stated otherwise, the term "image gradient" herein refers to the image gradient magnitude G(x, y) as opposed to the vector $\nabla I(x,y)$.

The gradient magnitude G in this case is given by Eq. 1:

$$G(x,y) = \sqrt{I_x^2(x,y) + I_y^2(x,y)} \qquad \text{Eq. 1}$$

Because only the magnitude is needed, the gradient may be determined as the square root of the sum of the squares of the spatial derivatives of the grayscale image in the x and y directions. In another embodiment the gradient magnitude may be determined as the sum of the squares of the spatial derivatives of the grayscale image in the x and y directions, without computing a square root. The first order spatial derivatives $I_x(x,y)$ and $I_y(x,y)$ are determined in both the x and y directions. The magnitude G(x, y) is then taken as in Eq. 1 as the square root of the sum of the squares. This determination is then used as the gradient magnitude output for gradient computation 106.

Spatial derivatives may be derived by performing a convolution operation between an image and the first order derivatives of a Gaussian kernel $g(\sigma_f, x,y)$. De-noising algorithms operate on images which are discrete input signals. To compute derivatives from discrete values, sums and differences of pixel intensities coming from neighborhoods may be computed. This is because the derivatives describe the rate of change of grayscale intensity and this rate is better observed across multiple pixels as opposed to looking at a single pixel only. The Gaussian kernel g is associated with some standard deviation parameter $\sigma_f$. This is equivalent to computing the derivatives of a blurred version of the image where the blurring is performed using $g(\sigma_f, x,y)$. The Gaussian kernel $g(\sigma_f, x,y)$ as well as its first order spatial derivatives $g_x(\sigma_f, x,y)$, $g_y(\sigma_f, x,y)$ are given in Eq. 2:

$$g(\sigma_I, x, y) = \frac{1}{2\pi\sigma_I^2} \cdot e^{-\frac{x^2+y^2}{2\sigma_I^2}},$$

$$g_x(\sigma_I, x, y) = \frac{-x}{2\pi\sigma_I^4} \cdot e^{-\frac{x^2+y^2}{2\sigma_I^2}},$$

$$g_y(\sigma_I, x, y) = \frac{-y}{2\pi\sigma_I^4} \cdot e^{-\frac{x^2+y^2}{2\sigma_I^2}}$$

Eq. 2

Figure 2:
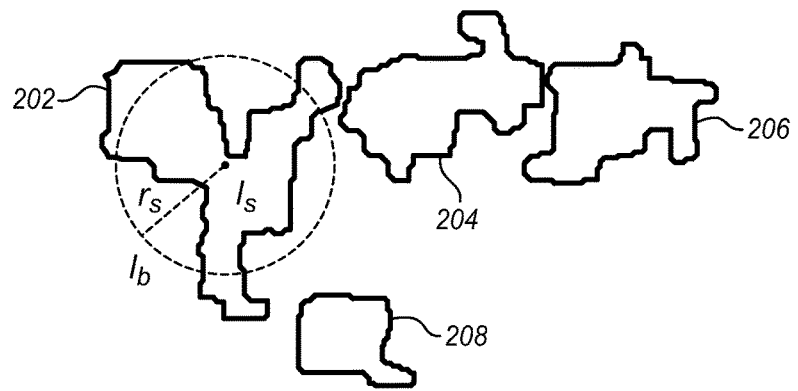
FIG. 2 is a diagram of a speckle model of irregular image intensity changes according to an embodiment.

The choice of the standard deviation parameter $\sigma_I$ affects spatial derivatives and therefore the behavior of the image de-noising algorithm. The choice of $\sigma_I$ is also related to average noise speckle size observed in an image. FIG. 2 shows a speckle model. Speckles are shapes or arbitrary contours 202, 204, 206, 208 that have edges defined by irregular changes in intensity. As shown the intensity $I_s$ inside a first speckle 202 is different from the intensity $I_b$ outside the speckle. Depending on the image and the image noise, speckles may be placed in an arbitrary way in an image. Speckles may overlap or be adjacent to each other. In FIG. 2 $r_s$ denotes an average speckle radius for a particular speckle 202. This radius is computed from an estimated centroid of the speckle as the average distance between all points in the speckle and the speckle's centroid.

Choosing a standard deviation parameter $\sigma_I$ much larger than the average speckle size allows meaningful edges of an image to easily be separated from the noise in the image. However, this result blurs smaller edges or curves such as hair, wrinkles, texture etc. On the other hand, if $\sigma_I$ is selected to be substantially smaller than $r_s$ then some noise speckles will remain in the image after the end of the de-noising process. Accordingly, the standard deviation parameter $\sigma_I$ may be selected as having some value which is in the same order of magnitude as the speckle radius $r_s$. This provides a balance between fine features of the image and noise.

$$\sigma_I = k \cdot r_s \qquad \text{Eq. 3}$$

For many portable devices with small sensor cameras, speckle diameters vary between 4-10 pixels in various resolutions. For such an image sensor a value $\sigma_I=4$ may be selected. This provides an appropriate balance between fine features and noise. The particular value for $\sigma_I$ may be modified to suit any of a variety of different image sensor noise characteristics.

For computational efficiency, the elements of convolution matrices associated with $g_x(\sigma_I, x,y)$, $g_y(\sigma_I, x,y)$ may be converted to integers through division with some small element value such as the smallest floating point value in the matrices associated with $g_x$, $g_y$. The size of these convolution matrices can also be made small taking into account the fact that values substantially higher than zero in $g_x$, $g_y$ are only found in the range $(-\sigma_I, \sigma_I)$ in the x and y dimensions. In some embodiments in which $\sigma_I=4$ a gradient magnitude computation stage may be made using 9×9 convolution matrices.

Having determined an image gradient magnitude 106, the gradient magnitude may be equalized 108 using a histogram of the image intensity. Intensity edges, which are important for the definition of an image, may vary significantly in terms of their associated image gradient magnitude value or thickness. Some edges may be associated with steeper intensity changes whereas others may be smoother.

A problem is caused when variations in image gradient magnitude values observed at important edges, impact the behavior of the de-noising system. For example such variations may affect subsequent blurring stages introducing artifacts into the de-noised image. To eliminate such artifacts, edges or curves of critical importance may be treated the same way, regardless of any differences in their image gradient magnitude values.

Another problem is caused in that that it is difficult to determine in absolute terms which image gradient values are associated with important edges and which are not. These problems are resolved by operation on a histogram equalized gradient $E(\sigma_I, x, y)$ instead of operating on the image gradient magnitude signal $G(\sigma_I, x, y)$. The histogram equalized gradient magnitude $E(\sigma_I, x, y)$ may be defined as follows:

$$E(\sigma_I,x,y) = F_{cdf}(G(\sigma_I,x,y)) \cdot 255 \qquad \text{Eq. 4}$$

where $F_{cdf}$ is the cumulative distribution function. A value of the equalized gradient $E(\sigma_I, x, y)$ at pixel position x, y denotes the percentage of gradient values that are smaller than or equal to $G(\sigma_I, x, y)$. Using the equalized gradient as a de-noising 'pilot' signal, it can be assessed whether pixels are associated with significant edges or not. This can be done without having to know the absolute gradient values of edges. Moreover variations in image gradient values, which may be significant between important edges, appear much smaller in the equalized gradient space.

De-noising using the equalized gradient signal is also based on an assumption that the intensity increments and decrements in the image due to meaningful edges or details are typically higher than the intensity increments and decrements due to noise. It is also based on an assumption that the pixels in the image which define edge details are typically much fewer than the remaining image pixels.

Figure 3:
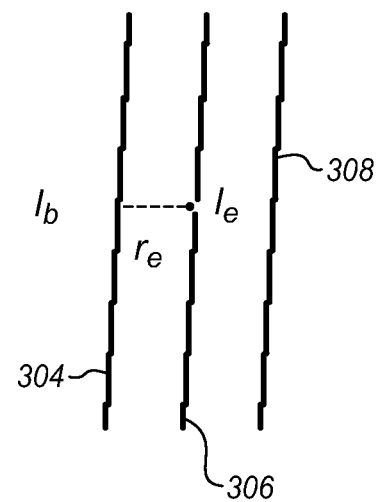
FIG. 3 is a diagram of an image edge model of intensity change edges according to an embodiment.

An image edge model according to some embodiments is shown in FIG. 3. In this model every edge is represented as a ridge of arbitrary length and width. Assuming that the highest or lowest intensity $I_e$ is observed at the ridge peak 306, another nearby ridge 304 occurs at an edge with an intensity $I_b$ that is associated with an intensity change $\Delta I_e = |I_e - I_b|$. The corresponding intensity change associated with an average noise speckle is $\Delta I_s = |I_s - I_b|$ as shown in FIG. 2. When the equalized gradient is a reliable indicator of the state of a pixel (i.e., important edge or noise) the following equation tends to hold:

$$\frac{\Delta I_e}{r_e} \gg \frac{\Delta I_s}{r_s} \Leftrightarrow \frac{|I_e - I_b|}{r_e} \gg \frac{|I_s - I_b|}{r_s} \qquad \text{Eq. 5}$$

As shown by Eq. 5, the equalized gradient is not only useful for classifying pixels between important edge pixels and noise but the equalized gradient also indicates the proximity of pixels to important edges. This is because intensity increases are smoother in pixels which are further away from ridge peaks but sharper for edge pixels closer to ridge peaks. As described in embodiments herein these properties may be used to control the degree of blurring which is applied to each pixel of the image. This is illustrated in FIG. 4.

Figure 4:
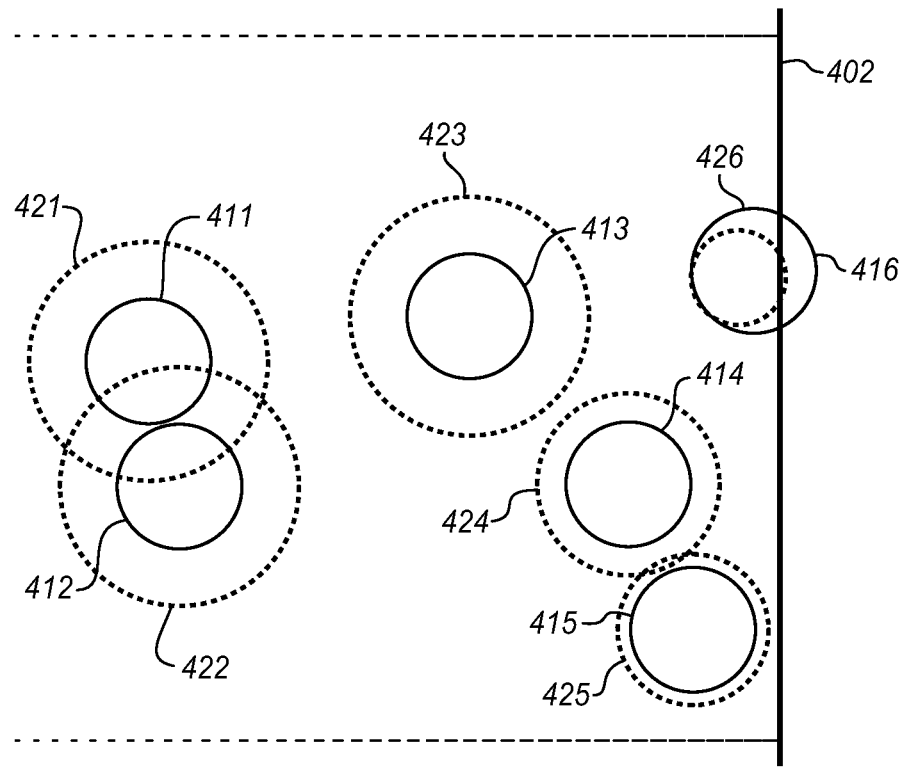
FIG. 4 is a diagram of burring radii applied to speckles of different sizes according to an embodiment.

FIG. 4 shows three speckles 411, 412, 413 that are far away from a ridge peak 402. For the pixels of these speckles, blurring is performed using large radii values 421, 422, 423 respectively. As shown the speckles have an actual radius as indicated in the drawing figure and the blurring radii of these three speckles are larger than the actual radius of the speckles. While all of the speckles are shown as round, this is to simplify the diagram. The actual shapes of real speckles are most likely irregular as shown, for example, in FIG. 2.

Three other speckles 414, 415, 416 are closer to the ridge peak 402. Speckle 416 is adjacent to the ridge peak. For the pixels of these three speckles blurring is performed using smaller radii values 424, 425, 426. These radii values may be computed so that the blurring operation does not visually alter the slope or peak of the ridge. These different radii values used for blurring the pixels of an input image may be determined by applying some non-linear function n( ) on a median filter-corrected equalized gradient signal as explained below.

The output of the histogram equalization is an equalized gradient magnitude signal $E(\sigma_I, x, y)$ based on a standard deviation value $\sigma_I$ chosen based on the average speckle size. The determination of this value may be repeated to produce a space of all equalized gradient representations of an image $E(\sigma, x, y)$ derived in the same manner as $E(\sigma_I, x, y)$ but using different values a of the standard deviation for different pixels. These values may be referred to as an "Equalized Gradient Space (EGS)" representation of an image.

The determination 108 of the equalized gradient $E(\sigma_I, x, y)$ from the gradient $G(\sigma_I, x, y)$ may be performed using a histogram computation. This is a non-local processing step and may be done once for the whole image. Such a histogram computation may be performed with only a memory lookup operation and a counter increase operation per pixel.

The equalized gradient computed in the previous stage is further corrected using a first median filter 110. Important edges sometimes consist of dark thick regions which are flat across a non-negligible number of pixels. The associated ridge peaks of these edges are stripes of constant grayscale intensity. The stripes may be quite wide. For this reason, gradient values appear much smaller in the center of these stripes, resulting in lower equalized gradient values. Lower equalized gradient values, on the other hand, cause wider blurring in the centers of stripes introducing artifacts in the de-noised image.

The first median filter 110 fills potential gaps in the equalized gradient $E(\sigma_I, x, y)$ in areas that have a high equalized gradient value. Using a median filter $M_v()$ of size $v \times v$ a corrected equalized gradient signal $H(\sigma_I, x, y)$ may be defined as:

$$H(\sigma_I, x, y) = M_v(E(\sigma_I, x, y)) \qquad \text{Eq. 6}$$

The width of the median filter may be in the same order of magnitude as the radius $\sigma_I$ of the Gaussian kernel used for deriving G, E. In the examples described above the median filter may have a size 7×7. In examples, thin dark lines which are present in the important edges of an equalized gradient space representation disappear completely after the median filter processing. The corrected equalized gradient $H(\sigma_I, x, y)$ may be referred to as a "de-noising pilot" 112. The de-noising pilot 112 from the median filter 110 may be referred to any of a variety of different processes as described in more detail below.

In the example of FIG. 5, the de-noising pilot is referred to a process 502 for de-noising an input frame. The input image frame 504 processed through an image pipeline or processor to produce a de-noised version of the same image frame as an output 514. First the input image frame is provided to compute a de-noising pilot 506 as described above. The de-noising pilot is then applied to a non-linear function n( ) 508.

In this stage 508 the pilot signal $H(\sigma_I, x, y)$ from block 506 is used as the input to a non-linear function n( ) which computes per pixel blurring radii. Any of a variety of different functions n( ) may be used in order to respond to the requirements of different environments and noise levels. The particular parameters of the function may be selected based on the intended use of the images and the nature of the image sensor. Different values may be tried empirically to determine which value provides a pleasing result.

The Table below provides four different levels of filtering that might be suitable for four different intended results or different image sensors. A function n( )=FAIR performs de-noising so that the result is pleasing to the human eye. A stronger n( )=MODERATE returns wider blurring radii than n( )=FAIR. This may be better suited to use when noise is removed for a gesture recognition pipeline. It may be useful for a vision algorithm (such as a Viola Jones algorithm) to recognize hand poses in low light conditions. n( )=DEEP and n( )=SUPER DEEP provide even larger blurring radii for even greater noise reduction. These functions are provided only as examples and any of these functions may be adapted to suit different implementations. Similar or different values may be used to suit different implementations. In addition while there are four levels of filtering in the Table, more or fewer may be used to suit different image arrays and different uses for the end results. These filter functions may all be operated using a small lookup table with very little computational resources being required.

A blurring radius $R(\sigma_I, x, y) = n(H(\sigma_I, x, y))$ returned by n( ) for a pixel position (x, y) is the standard deviation of a Gaussian kernel used in a convolution operation at pixel position (x, y). Four different functions for n( ) denoted as 'FAIR', 'MODERATE', 'DEEP' and 'SUPER DEEP' are presented in Table 1 below. The de-noising pilot H is expressed as a percentage, where 100% corresponds to the value 255 and 0% to zero. A blurring radius R=0 means no blurring. All functions below are piece-wise constant. While 8 different percentage ranges are shown, there may be more or fewer, depending on the desired results.

The functions below return some reasonably large constant blurring radius value for inputs smaller than a first threshold $T_1$, in this case 40%, then drop their outputs rapidly, up to inputs equal to a second threshold $T_2$, in this case 90%, and then keep their outputs constant (typically having zero radius value) for the remaining of the input values. The first threshold may be adjusted to anywhere from 30-70% potentially supporting a visually pleasing de-noising result. For the DEEP and SUPER DEEP, the first threshold may be increased to about 80% potentially without a significant effect. The second threshold may be reduced as low as 80-85% potentially while still providing a pleasing result. The particular values for the thresholds and for the radii and filter values may be adapted to each implementation. As an example, visually pleasing results may be obtained by having a low percentage range from 0 to about 55-70%, a high percentage range from 85 or 90% and above, and two to five ranges in between.

| n( ) | FAIR | | MODERATE | | DEEP | | SUPER DEEP | |
|---|---|---|---|---|---|---|---|---|
| H | R | Filter | R | Filter | R | Filter | R | Filter |
| >90 | 0 | 1 | 0 | 1 | 0 | 1 | 0 | 1 |
| 85-90 | 1 | 3 | 1 | 3 | 1 | 3 | 4 | 10 |
| 80-85 | 2 | 5 | 2 | 5 | 2 | 5 | 6 | 15 |
| 75-80 | 3 | 10 | 3 | 10 | 6 | 13 | 12 | 25 |
| 70-75 | 4 | 10 | 4 | 10 | 8 | 17 | 12 | 25 |
| 55-70 | 6 | 13 | 8 | 17 | 10 | 20 | 16 | 35 |
| 40-55 | 7 | 13 | 8 | 17 | 13 | 25 | 16 | 35 |
| ≤40 | 8 | 15 | 12 | 25 | 15 | 35 | 18 | 40 |

Table of Non-linear Functions for Per-pixel Gaussian Smoothing

The radius $R(\sigma_I, x, y)$ returned by the non-linear function stage 508 may be used for performing per pixel blurring 510 on the input image I(x, y). Blurring radii may be computed using the stages described above. The blurring is described in Eq. 7 below:

$$B(\sigma_I, x, y) = \sum_{i=-w}^{w} \sum_{j=-w}^{w} I(x+i, y+j) \cdot \frac{e^{-\frac{(x+i)^2+(y+j)^2}{R(\sigma_I, x, y)^2}}}{2\pi \cdot R(\sigma_I, x, y)^2} \qquad \text{Eq. 7}$$

where w is the blurring filter size, as shown, for example in the Table.

Before completing the de-noising process, the partially de-noised image $B(\sigma_f, x,y)$ is passed through a second median filter processing stage 512. This stage may be used to eliminate any noise speckles which may have been overlooked by the blurring operation of Eq. 7. Such speckles are typically those that are located exactly on the slopes or peaks of ridges associated with important lines or curves of images. Blurring on the slopes of ridges is not extensive so that the visual appearance of important image lines or curves is not altered. As a result, some noise speckles are not eliminated by the blurring stage 510.

Such speckles may be removed by using a second median filter. A filter $M_u(\ )$ of some small size u×u is sufficient for this purpose because the speckles that remain in this stage are not as large as the speckles in the original image. The filter size may be scaled based on the FAIR, MODERATE, DEEP, SUPER DEEP criteria mentioned above or according to any other scaling approach. The filter values, as in the first median filter may be selected by computation or empirically. As an example, for n( )=FAIR a filter size of u=3 or some other value from 2-4 may be used. For n( )=MODERATE, a filter size u=5 or some value from 4-8 may be used. According to one embodiment, the resulting de-noised image $D(\sigma_f, x,y)$ is defined in Eq. 8:

$$D(\sigma_f,x,y)=M_u(B(\sigma_f,x,y)) \quad \text{Eq. 8}$$

After the second median filter is applied 512, the de-noised frame is produced as an output 514. This output frame is based on the input frame but is de-noised to a degree that may be determined based on the intended use of the frame. For human viewing, a modest amount of de-noising may be preferred while for machine vision, a larger amount of de-noising may be preferred.

Many of the techniques described herein may be applied to develop other information and image improvements. The above description describes deriving an equalized gradient signal $E(\sigma_f, x, y)$ based on a standard deviation value $\sigma_f$ chosen based on the average speckle size. The space of all equalized gradient representations of an image $E(\sigma, x, y)$ may be derived in the same manner as $E(\sigma_f, x, y)$ but using different values $\sigma$ of the standard deviation. This is referred to herein as the "Equalized Gradient Space" (EGS) representation of an image. The EGS caries information that may be used for a variety of different additional digital image processing techniques. The EGS may be used for improving upon the performance of a de-noising algorithm or for estimating the properties of noise in an image. As described below, the $E(\sigma_f, x, y)$ signal may be used to estimate noise properties.

The equalized gradient space can be used for estimating a variety of different noise properties of an image. FIG. 6 is a process flow diagram for using the EGS to estimate the average speckle size or the standard deviation. Other properties for the noise in an input image may be estimated in a similar way. The process of FIG. 6 begins with an input image 604 which is buffered in a portable computer or tablet, a camera or in an offline image analysis system such as a computer workstation.

To determine the noise properties, a de-noising pilot is first determined 606 for the input image 604. As in the example of FIG. 1, the gradient magnitude is first determined. A histogram is applied to equalize the gradient magnitude and a median filter is then applied to produce the EGS which serves as a de-noising pilot. These operations may be performed in the same way as described above with respect to FIG. 1.

The EGS is applied to the input image to search for smooth areas 612. The smooth areas are the areas that do not have edges or sharp intensity transitions in the actual scene. This search may be done in a variety of different ways. In one example, the search is for windows. In this context windows are the portions of the input image, for which the de-noising pilot has values below a predetermined threshold. The low pilot values are an indication that there are no significant edges or lines in these windows. These windows are likely to correspond to smooth areas in the images with only small variations in intensity. The primary source of intensity variations is then noise.

The windows found during the search that have low pilot values are then applied to a search for areas of constant intensity at 614. If no windows are found, then the threshold may be adjusted or a different image may be used. The search for constant intensity areas may be done by searching for sub-windows, that is portions of each window, that have the same or about the same mean intensity. The same mean intensity may be determined by comparing the mean intensity for groups of pixels values and comparing the differences in mean intensity to a variation threshold. If the differences are less than a threshold, then the pixels may be declared to be associated with the same mean intensity. Otherwise the outlying pixel values are excluded. The same mean intensity may also be found across sub-windows. The constant or near constant mean intensity sub-windows that are found during this search are then searched for noise speckles at 616.

Speckles can be detected then by determining the positions of intensity peaks inside these sub-windows. The boundaries of the speckles can be determined at 618 by tracing surrounding areas around the peaks where the intensity is restored to average or the mean value for the sub-window. In other words, the contour corresponds to a line of pixels for which the pixel values are about equal to the average intensity for the sub-window. The line may be determined using a variety of different techniques including but not limited to edge detection, boundary analysis, interpolation, curve rendering, segmentation, and shape analysis. These contours of intensity change are then interpreted as the edges of the speckle instead of as lines or edges in the input image.

The speckle boundaries may then be used to infer a variety of different noise properties at 620. As an example, the average speckle size may be determined for the speckle boundaries that have been found at 618. This average speckle size may be used to infer an average for the entire image. Similarly, the noise standard deviation may be determined using the intensity of the speckle center, and the speckle boundaries for the found speckles. Since the EGS is used to select a window with a smooth area, only a part of the image is evaluated. However, noise is typically distributed evenly across areas of an image so that similar noise properties may be expected in areas of the image that are not evaluated. These properties that characterize the smooth areas detected using the equalized gradient space may be used to infer overall noise properties.

In this technique for estimating the noise properties of an input image, the set of its equalized gradient representations is used. Each equalized gradient representation in the set is associated with a different value for the standard deviation parameter $\sigma_f$. As described above this set of representations forms the "Equalized Gradient Space." The Equalized Gradient Space may include representations associated with all possible values of the standard deviation parameter $\sigma_f$, a subset of values of the standard deviation parameter $\sigma_f$, or a single value of $\sigma_f$ only. The EGS may also be used with a gesture recognition, object recognition, or machine vision system to enhance an image in low light conditions. The enhanced image increases the detection rate of the vision algorithms, such as a Viola-Jones object detector. The de-noising pilot signal may successfully be used to eliminate the amplified noise coming from image enhancement algorithms such as an adaptive histogram specification. This frame quality enhancement is shown in the process flow diagram of FIG. 7.

The enhanced quality frame improves the detection rate of computer vision systems further by using an enhanced processing pipeline with adaptive histogram specification or brightness enhancement to strengthen the details of frames containing different poses or gestures. This improves the system's detection of these poses or gestures. The improvements are especially significant in low light conditions when noise is higher.

Figure 7:
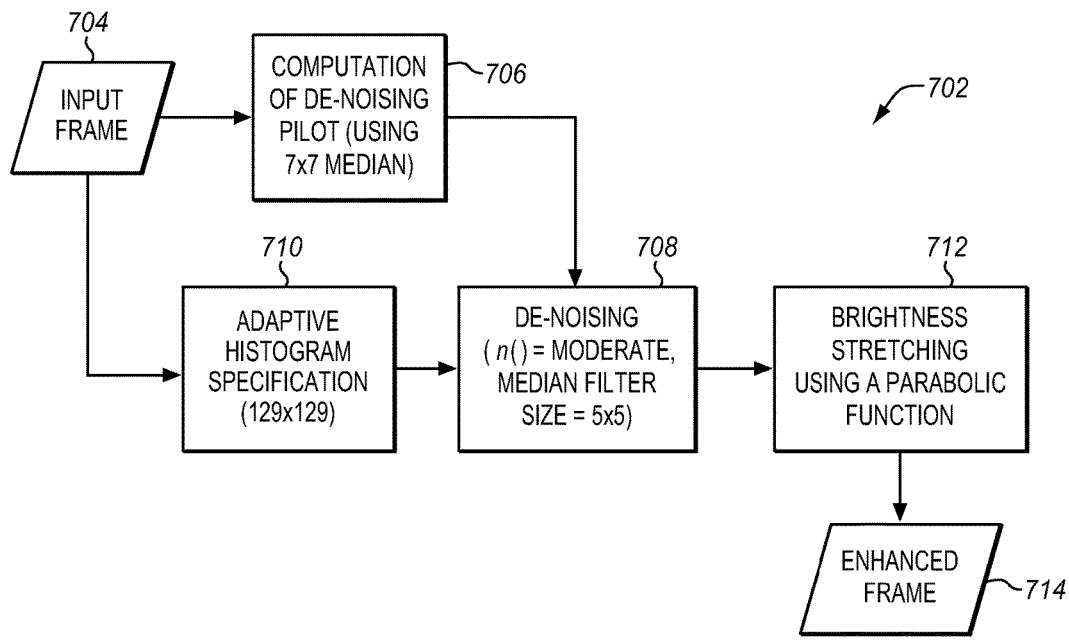
FIG. 7 is a process flow diagram of enhancing an input image frame for night vision uses according to an embodiment.

An example vision image processing pipeline 702 is shown in FIG. 7. The resolution of all of the frames in this example is VGA (640×480 pixels). Larger or smaller resolutions may also be used, depending on the implementation. Many devices use VGA as the resolution for a front facing camera. While this works well for video conferencing, as image sensors become smaller and less expensive, higher resolutions are being offered. An input image frame 704 is first passed to a de-noising pilot computation stage 706, which computes a de-noising pilot. This may be done in any of a variety of different ways. In some embodiments, the de-noising pilot is determined as described in the context of FIG. 1 using gradient computation 106, histogram equalization 108 and a first median filter 110. In one embodiment a standard deviation value $\sigma_f=4$ and a median filter of size of 7×7 are used.

In parallel, the frame is passed to an adaptive histogram specification stage 708. In this stage, image enhancement is performed adaptively on a per pixel basis, taking into account pixel values of e.g. 129×129 square neighborhoods around each pixel. For smaller resolutions, the histogram specification windows can be made smaller than 129×129, resulting in higher performance or lower power implementations. Histogram specification may be performed using a sliding window or in a variety of other ways. In one embodiment, a linear histogram is used, having a slope equal to −1 for inputs between 0 and 128 and a slope equal to +1 for inputs between 128 and 255.

The adaptive histogram specification 708 strengthens image details that are well-suited to pose detection, such as the shadows between fingers of a closed palm pose. A drawback of this histogram specification that is also common to other histogram-based techniques is that the histogram specification amplifies noise. Amplified noise speckles may appear as smudges, which can cause detection failures when trying to detect a pose or other feature of an image. Such a detection failure problem may be observed for example when using a trained Viola Jones-based pose detector coupled with a custom filter for pruning false positives. To address this issue, the histogram enhanced frame is de-noised at 708 using the computed de-noising pilot 706 mentioned above.

The de-noising operation 708 uses a non-linear function n( ) as described above for example as the nonlinear function 508, per-pixel Gaussian blurring 510, and second median filter 512 of FIG. 5. In this example, the MODERATE function is used due to the enhanced noise of the histogram and the use of the image for pose recognition. The de-noising operation uses a second median filter size, in this case of size 5×5.

To produce the final enhanced image frame 714, the de-noised frame is optionally applied to a brightness enhancement stage 712. This stage may use any of a variety of different brightness enhancement techniques. In one example a parabolic curve is used for the enhancement. The parabolic curve is associated with curvature defined using a parameter $\alpha$ and a destination range $\omega_0$. This stage 712 starts with input minimum and maximum pixel intensities min, max and a pixel intensity value v. A brightness enhanced pixel intensity u may be determined from v using for example the operations of Eqs. 9-14 below:

$$\text{if } 255 - \omega_0 > \min \qquad \text{Eq. 9}$$
$$\text{then } F \leftarrow \min, \omega \leftarrow 255 - \min$$
$$\text{else } F \leftarrow 255 - \omega_0, \omega \leftarrow \omega_0$$

$$U \leftarrow \omega \cdot \frac{v - \min}{\max - \min} \qquad \text{Eq. 10}$$

$$A \leftarrow \frac{a}{2\omega} \qquad \text{Eq. 11}$$

$$B \leftarrow \frac{Ua}{\omega} - \alpha - 1 \qquad \text{Eq. 12}$$

$$C \leftarrow \frac{U^2 a}{2\omega} - Ua + \alpha \qquad \text{Eq. 13}$$

$$u \leftarrow F + \frac{-B - \sqrt{B^2 - 4AC}}{2A} \qquad \text{Eq. 14}$$

The described computer vision pipeline of FIG. 7 is able to provide a significant detection rate improvement for a variety of poses and gestures especially in low light. In some cases a seven fold improvement may be provided.

Figure 8:
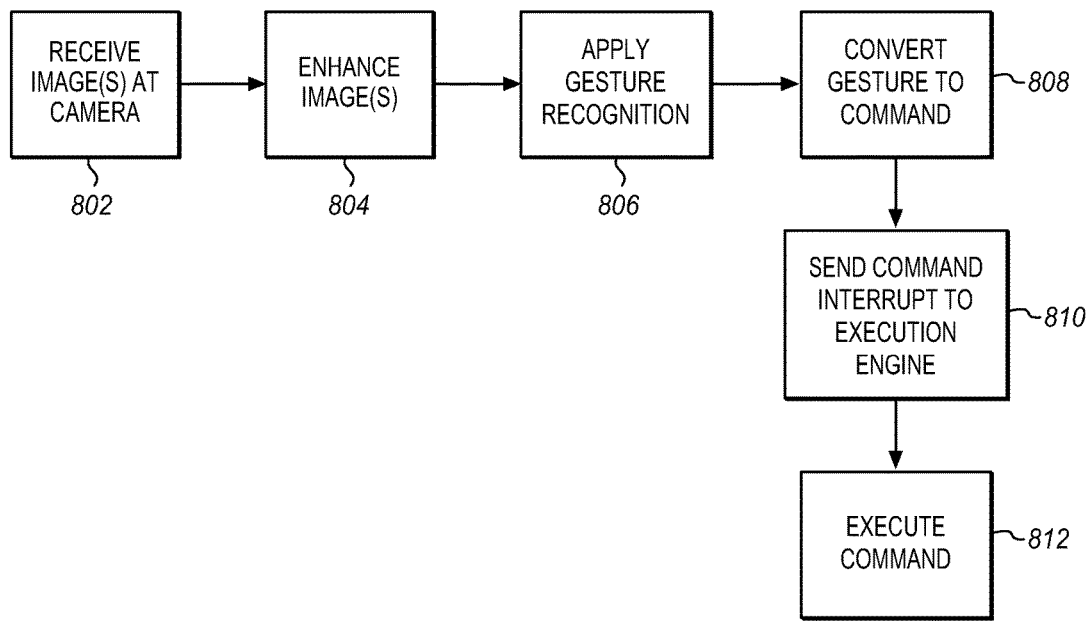
FIG. 8 is a process flow diagram of using a camera to generate a command according to an embodiment.

FIG. 8 is a process flow diagram of using a camera to generate a command using the image enhancement of FIG. 7. At 802, the device receives images through an image sensor such as a camera. These images are understood to be gestures or poses for a command interface. The images are then enhanced at 804 as shown for example in FIG. 7. The enhanced image is then applied to a gesture recognition system at 806. The image sensor and enhancement may be in a camera or in a camera and image processor respectively. The gesture recognition may be in the same image processor or it may be in a graphics or central processing unit depending on the nature of the device.

After the gesture is recognized, it may then be mapped to a command at 808. The command is then sent to an execution engine. This may be in response to a poll. It may be sent as an interrupt or with an interrupt or in any other manner desired depending on the nature of the system. After the command is received, typically at the central processing unit, the command is executed at 812. The command may be an authentication, an identification, or any of a variety of different user inputs.

The techniques described herein in some cases are able to completely remove speckles from still images while not removing image details such as wrinkles and tree leaves. Moreover, in combination with other techniques it improves the performance of vision algorithms. The techniques may be implemented with phone and tablet products to provide better image and video capture capabilities and HDR (High Dynamic Range) imaging. The techniques may be used in these and many other products for gesture-enabled switches for devices such as lights, TV sets, temperature control units, and user interfaces for computers, tablets, televisions, gaming consoles, etc.

The present description presents a new, different balance between low cost localized operations per-pixel and the preservation of fine details of images such as wrinkles, hair, remote furniture lines, tree leaves etc. Compared to other localized algorithms like local smoothing filters, anisotropic filters, total variation etc. the described techniques have the advantage of maintaining more of the fine details of images while not introducing new artifacts, or retaining existing artifacts. Compared to non-localized techniques such as neighborhood filters, wavelet threshold filters or non-local means filters, the described techniques have the advantage of better power and performance characteristics, This is in part due to using mostly simple localized operations per pixel, as opposed to more expensive operations that require scanning large portions of an image. The only non-local processing operation used in the described techniques is a part of determining the gradient histogram which is done once for the whole image. This is typically inexpensive, as it may be done with only a memory lookup operation and a counter increase operation per pixel.

Figure 9:
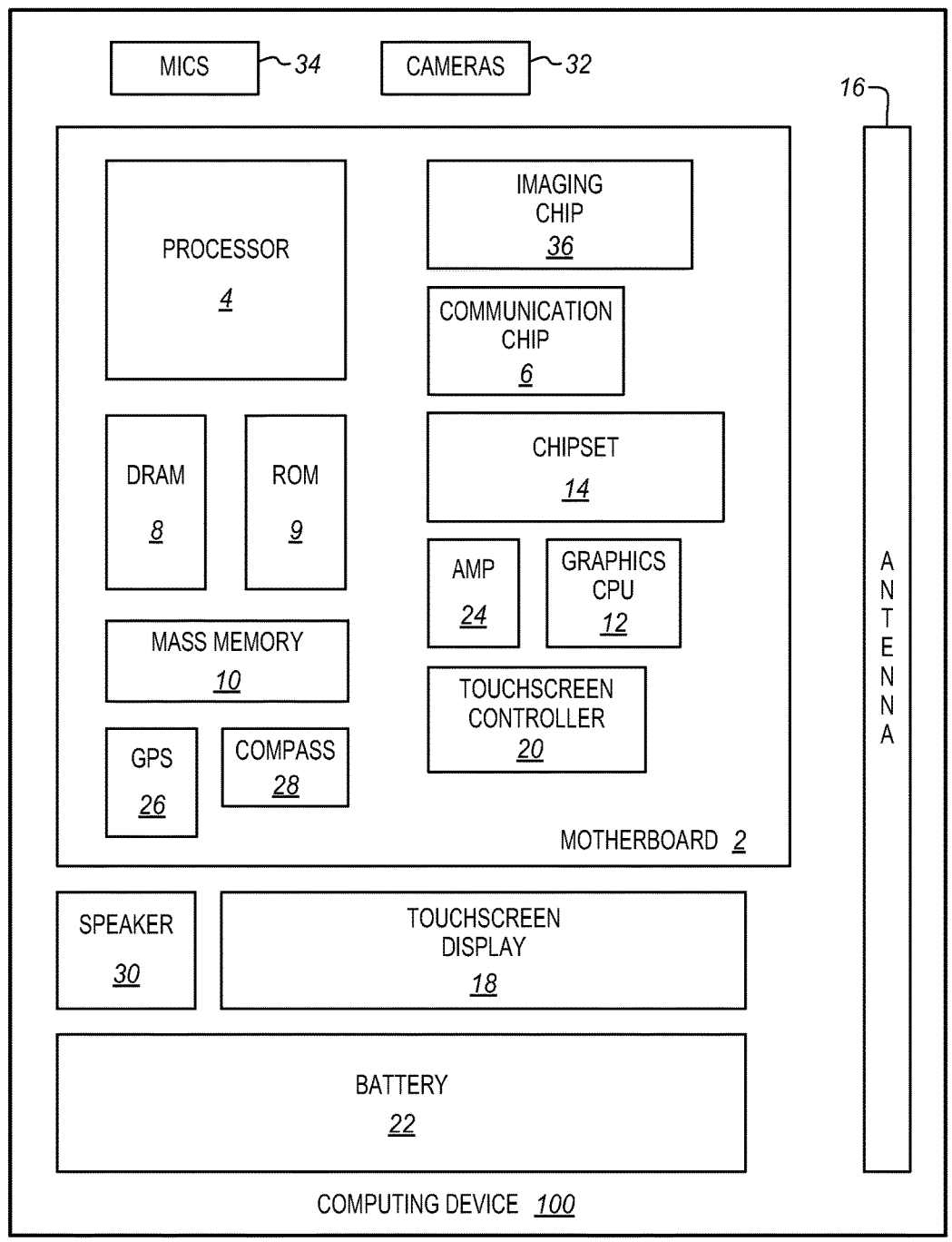
FIG. 9 is a block diagram of a photographic device incorporating image de-noising according to an embodiment.

FIG. 9 illustrates a portable image capture device 100 in accordance with one implementation. The imaging device 100 houses a system board 2. The board 2 may include a number of components, including but not limited to a processor 4 and at least one communication package 6. The communication package may be coupled to one or more antennas 16. The processor 4 is physically and electrically coupled to the board 2.

Depending on its applications, image capture device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chip set 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, one or more cameras 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The camera array may be coupled to an image chip 36, such as an imaging signal processor and to the processor 4, either directly or through the image chip. The image chip may take a variety of different forms, such as a graphics co-processor, or a separate dedicated imaging management module. Such a module or device may comprise logic, algorithms, and/or instructions operative to capture, process, edit, compress, store, print, and/or display one or more images. These processes may include de-noising, image recognition, image enhancement and other processes described herein. In some embodiments, the imaging management module may comprise programming routines, functions, and/or processes implemented as software within an imaging application or operating system. In various other embodiments, the imaging management module may be implemented as a standalone chip or integrated circuit, or as circuitry comprised within the processor, within a CPU, within a graphics chip or other integrated circuit or chip, or within a camera module.

The communication package 6 enables wireless and/or wired communications for the transfer of data to and from the video device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The video device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 may include all of the components of the camera or share resources, such as memory 8, 9, 10, processing 4 and user interface 12, 20, with other video device components and functions. The processor 4 is coupled to the camera and to memory to receive frames and produce enhanced images and machine vision as described. The cameras may also include an image processing system, as described above, to share tasks with the processor 4 to generate enhanced or de-noised images.

In various implementations, the image capture device 100 may be a video camera, a digital single lens reflex or mirror-less camera, a cellular telephone, a media player, laptop, a netbook, a notebook, an ultrabook, a smartphone, a wearable device, a tablet, a personal digital assistant (PDA), an ultra mobile PC, or a digital video recorder. The image capture device may be fixed, portable, or wearable. In further implementations, the image capture device 100 may be any other electronic device that records a sequence of image frames and processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method of de-noising an image that includes determining an intensity gradient magnitude for an image, determining blurring radii for a plurality of pixels of the image using the intensity gradient, and blurring the image at each of the plurality of pixels using the blurring radii.

In further embodiments determining an intensity gradient magnitude comprises convolving the input image with first order Gaussian derivatives associated with a standard deviation of the intensity of the image.

Further embodiments include after determining an intensity gradient magnitude, passing the gradient magnitude through an equalization operation to obtain an equalized gradient magnitude before determining blurring radii.

In further embodiments the equalization operation includes applying a cumulative distribution function to the intensity gradient magnitude.

In further embodiments the cumulative distribution function denotes a percentage of gradient values that are smaller than or equal to the intensity gradient magnitude for each of the plurality of pixels.

In further embodiments the equalization operation comprises stretching results from the cumulative distribution function to fill a predefined range.

Further embodiments include correcting the equalized gradient magnitude by applying a median filter to obtain a de-noising pilot and wherein determining blurring radii comprises passing the de-noising pilot through a non-linear function before determining blurring radii using the non-linear function of the de-noising pilot.

In further embodiments the median filter is determined by a Gaussian derivative standard deviation parameter Further embodiments include applying a second median filter to the image after blurring the image.

Some embodiments pertain to a machine-readable medium having instructions, that when operated on by the machine, cause the machine to perform operations that include determining an intensity gradient magnitude for an image, determining blurring radii for a plurality of pixels of the image using the intensity gradient, and blurring the image at each of the plurality of pixels using the blurring radii.

In further embodiments wherein determining an intensity gradient magnitude comprises convolving the input image with first order Gaussian derivatives associated with a standard deviation of the intensity of the image and passing the gradient magnitude signal through an equalization operation by applying a cumulative distribution function to the intensity gradient magnitude to obtain an equalized gradient magnitude.

Further embodiments include correcting the equalized gradient magnitude by applying a median filter to obtain a de-noising pilot and wherein determining blurring radii comprises passing the de-noising pilot through a non-linear function before determining blurring radii using the non-linear function of the de-noising pilot.

Some embodiments pertain to an apparatus that includes a camera to capture an image, the image including noise, an image store coupled to the camera to store the image, a processor coupled to the image store to receive the image and for determining an intensity gradient magnitude for the image, determining blurring radii for a plurality of pixels of the image using the intensity gradient magnitude, and blurring the image at each of the plurality of pixels using the blurring radii to reduce the noise, and a graphics processor coupled to the processor to render the image with reduced noise.

In further embodiments the processor further corrects an equalized gradient magnitude by applying a median filter to obtain a de-noising pilot and wherein determining blurring radii comprises using the de-noising pilot.

In further embodiments the median filter is determined by a Gaussian derivative standard deviation parameter In further embodiments the processor further applies a second median filter to the image after blurring the image.

Some embodiments pertain to a method of determining noise properties of an image that includes determining a gradient magnitude for an image, finding windows within the image that correspond to smooth areas of the image using the gradient magnitude, finding speckles within the windows, and estimating a noise property for the image using the found speckles.

In further embodiments finding windows comprises computing a de-noising pilot from an intensity gradient magnitude and searching for windows for which the de-noising pilot is less than a predetermined threshold.

In further embodiments finding windows further comprises finding sub-windows within each found window for which the mean intensity is the same or within a threshold difference.

In further embodiments finding speckles comprises finding intensity peaks within the windows and then finding contours around the intensity peaks.

In further embodiments the windows have an average intensity and wherein finding contours comprises finding contours corresponding to an intensity change from the intensity peak to an intensity that is about equal to the average intensity.

In further embodiments estimating a noise property comprises determining an average size for each of the found speckles.

In further embodiments estimating a noise property comprises determining a standard deviation of the noise using the found speckles.

Some embodiments pertain to a machine-readable medium having instructions that when operated on by the machine cause the machine to perform operations that include determining a gradient magnitude for an image, finding windows within the image that correspond to smooth areas of the image using the gradient magnitude, finding speckles within the windows, and estimating a noise property for the image using the found speckles.

In further embodiments finding windows comprises computing a de-noising pilot from an intensity gradient magnitude and searching for windows for which the de-noising pilot is less than a predetermined threshold and finding sub-windows within each found window for which the mean intensity is the same or within a threshold difference.

In further embodiments finding speckles comprises finding intensity peaks within the windows and then finding contours around the intensity peaks corresponding to an intensity change from the intensity peak to an intensity that is about equal to the average intensity.

Some embodiments pertain to an apparatus that includes a camera to capture an image, the image including noise, an image store coupled to the camera to store the image, a processor coupled to the image store to receive the image and for determining noise properties of an image by determining a gradient magnitude for an image, finding windows within the image that correspond to smooth areas of the image using the gradient magnitude, finding speckles within the windows, and estimating a noise property for the image using the found speckles, and a graphics process to render a presentation of the determined noise properties.

In further embodiments estimating a noise property comprises determining an average size for each of the found speckles.

In further embodiments estimating a noise property comprises determining a standard deviation of the noise using the found speckles.

Some embodiments pertain to a method of enhancing an image that includes determining a de-noising pilot signal for a received image, determining a result of an adaptive histogram specification operation for a plurality of pixels of the received image, and de-noising the result of an adaptive histogram specification operation of the image using the de-noising pilot signal to produce an enhanced image.

Further embodiments include stretching the brightness of the de-noised result of an adaptive histogram specification operation before producing the enhanced image.

In further embodiments de-noising comprises applying a parabolic curve to the result of an adaptive histogram specification operation of the image.

In further embodiments determining a result of an adaptive histogram specification operation comprises counting the number of pixels with intensity smaller than the intensity of to each of the plurality of pixels inside neighborhoods around each of the plurality of pixels and counting the number of pixels with intensity equal to the intensity of each of the plurality of pixels inside neighborhoods around each of the plurality of pixels.

In further embodiments determining a de-noising pilot signal comprises determining an intensity gradient magnitude for the image.

In further embodiments determining a de-noising pilot signal comprises determining the intensity gradient magnitude by convolving the input image with first order Gaussian derivatives associated with a standard deviation of the intensity of the image and passing the gradient magnitude through an equalization operation to obtain an equalized gradient magnitude.

In further embodiments determining a de-noising pilot further comprises correcting the equalized gradient magnitude by applying a median filter to the equalized gradient magnitude.

Some embodiments pertain to a machine-readable medium having instructions that when operated on by the machine cause the machine to perform operations that include determining a de-noising pilot signal for a received image, determining a result of an adaptive histogram specification operation for a plurality of pixels of the received image, and de-noising the result of an adaptive histogram specification operation of the image using the de-noising pilot signal to produce an enhanced image.

Further embodiments include stretching the brightness of the de-noised result of an adaptive histogram specification operation before producing the enhanced image.

In further embodiments brightness stretching comprises applying a parabolic curve to the result of an adaptive histogram specification operation of the image.

Some embodiments pertain to an apparatus that has a camera to capture an image, the image including noise, an image store coupled to the camera to store the image, a processor coupled to the image store to determine a de-noising pilot signal for the image, to determining a result of an adaptive histogram specification operation for a plurality of pixels of the received image, and to de-noise the result of an adaptive histogram specification operation of the image using the de-noising pilot signal to produce an enhanced image, and a graphics processor coupled to the processor to render the enhanced image.

In further embodiments determining a result of an adaptive histogram specification operation comprises counting the number of pixels with intensity smaller than the intensity of each of the plurality of pixels inside neighborhoods around each of the plurality of pixels and counting the number of pixels with intensity equal to the intensity of each of the plurality of pixels inside neighborhoods around each of the plurality of pixels.

In further embodiments determining a de-noising pilot signal comprises determining an intensity gradient magnitude for the image.

What is claimed is:

1. A method of de-noising an image comprising:
   determining an intensity gradient magnitude for each of a plurality of pixels of an image, each intensity gradient magnitude specific to one of the plurality of pixels and the intensity gradient magnitude varying among the plurality of pixels;
   determining blurring radii for each of the plurality of pixels of the image using the intensity gradient magnitude, the blurring radii varying among the plurality of pixels; and
   blurring the image at each of the plurality of pixels using the blurring radii.

2. The method of claim 1, wherein determining an intensity gradient magnitude comprises convolving the input image with first order Gaussian derivatives associated with a standard deviation of the intensity of the image.

3. The method of claim 1, further comprising after determining an intensity gradient magnitude, passing the intensity gradient magnitude through an equalization operation to obtain an equalized gradient magnitude before determining blurring radii.

4. The method of claim 3, wherein the equalization operation includes applying a cumulative distribution function to the intensity gradient magnitude.

5. The method of claim 4, wherein the cumulative distribution function denotes a percentage of gradient values that are smaller than or equal to the intensity gradient magnitude for each of the plurality of pixels.

6. The method of claim 4, wherein the equalization operation comprises stretching results from the cumulative distribution function to fill a predefined range.

7. The method of claim 3, further comprising correcting the equalized gradient magnitude by applying a median filter to obtain a de-noising pilot and wherein determining blurring radii comprises passing the de-noising pilot through a non-linear function before determining blurring radii using the non-linear function of the de-noising pilot.

8. The method of claim 7, wherein the median filter is determined by a Gaussian derivative standard deviation parameter.

9. The method of claim 7, wherein the median filter returns a larger blurring radius for pixels in the interior of smooth areas and a smaller blurring radius for pixels that define details.

10. The method of claim 7, further comprising applying a second median filter to the image after blurring the image.

11. A non-transitory machine-readable medium having instructions, that when operated on by the machine, cause the machine to perform operations comprising:
   determining an intensity gradient magnitude magnitude for each of a plurality of pixels of an image, each intensity gradient magnitude specific to one of the plurality of pixels and the intensity gradient magnitude varying among the plurality of pixels;
   determining blurring radii for each of the plurality of pixels of the image using the intensity gradient magnitude, the blurring radii varying among the plurality of pixels; and
   blurring the image at each of the plurality of pixels using the blurring radii.

12. The medium of claim 11, wherein determining an intensity gradient magnitude comprises convolving the input image with first order Gaussian derivatives associated with a standard deviation of the intensity of the image and passing the intensity gradient magnitude signal through an equalization operation by applying a cumulative distribution function to the intensity gradient magnitude to obtain an equalized gradient magnitude.

13. The medium of claim 12, further comprising correcting the equalized gradient magnitude by applying a median filter to obtain a de-noising pilot and wherein determining blurring radii comprises passing the de-noising pilot through a non-linear function before determining blurring radii using the non-linear function of the de-noising pilot.

14. An apparatus comprising:
   a camera to capture an image, the image including noise;
   an image store coupled to the camera to store the image;
   a processor coupled to the image store to receive the image and for determining an intensity gradient magnitude for each of a plurality of pixels of the image, each intensity gradient magnitude specific to one of the plurality of pixels and the intensity gradient magnitude varying among the plurality of pixels, determining blurring radii for the plurality of pixels of the image using the intensity gradient magnitude, the blurring radii varying among the plurality of pixels, and blurring the image at each of the plurality of pixels using the blurring radii to reduce the noise; and
   a graphics processor coupled to the processor to render the image with reduced noise.

15. The apparatus of claim 14, wherein the processor further corrects an equalized gradient magnitude by applying a median filter to obtain a de-noising pilot and wherein determining blurring radii comprises using the de-noising pilot.

16. The apparatus of claim 15, wherein the median filter is determined by a Gaussian derivative standard deviation parameter.

17. The apparatus of claim 16, wherein the processor further applies a second median filter to the image after blurring the image.

\* \* \* \* \*